United States Patent [19]

Campbell

[11] 3,715,224
[45] Feb. 6, 1973

[54] SOLUBLE AND COLLOIDAL SILICATES

[75] Inventor: Larry E. Campbell, Painted Post, N.Y.

[73] Assignee: Corning Glass Works, Corning, N.Y.

[22] Filed: June 12, 1970

[21] Appl. No.: 45,614

[52] U.S. Cl. .................................106/74, 106/84
[51] Int. Cl. .................................C09d 1/04
[58] Field of Search.................................106/74, 84

[56] References Cited

UNITED STATES PATENTS 1,949,914   3/1934   Larson .................................106/74

OTHER PUBLICATIONS

The Condensed Chemical Dictionary, Reinhold Pub. Corp., N.Y., N.Y., 4th Ed., 1950, Page 693. (Sci. Lib. Q.D. 5 C.5)

Primary Examiner—James E. Poer
Attorney—Clarence R. Patty, Jr. and Clinton S. Janes, Jr.

[57] ABSTRACT

This invention relates to the production of solutions and/or colloidal suspensions of water-soluble silicates containing certain monovalent and divalent cations which normally result in water-insoluble silicates. The process involves reacting in water a compound of the monovalent and/or divalent cations with a chelating or complexing agent exhibiting stability at a pH greater than 7 to yield a solution and/or colloidal suspension of complexed silicates. Where desired, the said solution and/or colloidal suspension can be cured to a solid body.

10 Claims, 3 Drawing Figures

SOLUBLE AND COLLOIDAL SILICATES

BACKGROUND OF THE INVENTION

Several water-soluble silicate compounds are well-known in the art. Such compounds include sodium silicate, potassium silicate, and quaternary ammonium silicate which readily dissolve in water to form true solutions therewith. Inasmuch as the pH of these solutions is higher than about 10.5, the silica will remain soluble therein. When attempts were undertaken to employ silicate compounds having polyvalent cations or monovalent cations other than those recited about, insoluble silicate or hydroxide precipitates resulted. Therefore, since the compositions of these solutions have been confined to those cations, the utility thereof has been somewhat limited. It has been apparent that additions of such metal oxides of form RO, such as cadmium oxide, copper oxide, calcium oxide, strontium oxide, barium oxide, cobalt oxide, lead oxide, magnesium oxide, mercury oxide, nickel oxide, zinc oxide, and manganese oxide, or certain oxides of form $R_2O$, such as $Cu_2O$ and $Ag_2O$, would be desirable in securing different chemical and physical properties. Nevertheless, such solutions have not heretofore been possible due to the precipitation of insoluble hydroxides or silicates of those cations.

The utility of soluble silicates as starting materials for the production of glass articles is disclosed in copending U.S. S. Pat. application Ser. No. 45,806, filed of even date herewith by J. E. Pierson and S. D. Stookey. That application describes the formation of porous silica bodies from soluble silicate solutions employing formaldehyde, paraformaldehyde, glyoxal, and/or formamide as gelation agents. Thus, the aforementioned gelation agents, when added to true solutions, colloidal solutions, or suspensions of such soluble silicates as lithium silicate, sodium silicate, potassium silicate, and quaternary ammonium silicate, dissolve therein and react slowly and uniformly therewith to partially neutral the alkali or ammonium ions present and consequently polymerize the silica.

The solutions and/or suspensions of soluble silicate and gelation agent are reacted by exposing them to a moderately low temperature. After the reaction between the soluble silicate and gelation agent has occurred, the polymerized silica body can be washed in water, acid, or other suitable solvent. Where the body contains water-leachable solids, a coherent, open-celled, porous silica material can be obtained.

Copending U.S. Pat. application, Ser. No 45,905, also filed concurrently herewith by F. L. Orso and T. E. Pierce, now abandoned, discloses that the reacted but unleached polymerized silica of Pierson and Stookey can be fired in a particular manner to consolidate the reacted body into a solid glass article exhibiting substantially the same body geometry.

Finally, copending U.S. Pat. application, Ser. No. 45,907, filed of even date herewith by H. E. Meissner and S. D. Stookey, now abandoned, describes the manufacture of solid glass articles and self-supporting, porous glass bodies from true solutions, colloidal solutions, and suspensions of soluble silicates through the utilization of certain esters and inorganic salts as gelation agents which hydrolyze to weak acids, and thereby polymerize the silica in like manner to that disclosed by Pierson and Stookey.

SUMMARY OF THE INVENTION

I have discovered that water-soluble silicates of certain monovalent and divalent cations which normally yield water-insoluble silicates can be produced by complexing the monovalent and/or divalent cations in such a manner that the resulting complex cation silicate is rendered water soluble and non-reactive with respect to silica. The scientific literature defines a complexing agent as a compound which will form a covalently coordinated bond to a metal ion. A chelating agent is a compound which has two or more complexing sites per molecule of which at least two can be bonded to a metal ion. The complexing agent must be stable at a pH greater than 7 such that solutions and/or colloidal suspensions of the monovalent and/or divalent cation silicates can be formed and stabilized. In addition, it is apparent that the formation of the complexed cation must be favorable relative to the formation of a silicate and in regard to any concomitant formation of a hydroxide. In sum, the complexing agent must be stable at a pH greater than 7 and, preferably, will not produce reaction products exhibiting a pH of less than 7. However, complexing agents which do yield reaction products having a pH less than 7 can be utilized if such will demonstrate stability when the pH is increased above 7 with a suitable base. When necessary, the pH of the solution and/or colloidal suspensions can be controlled through the addition of acidic and basic components to maintain the pH thereof above 7.

The complexing agents utilized have the further faculty that the bonds developed with the monovalent and divalent cations can be broken through either heat or a chemical action where it is desired to release the cations to cause the precipitation of a silicate or a hydroxide with the subsequent formation of insoluble products. This curing operation to a solid body can involve one or more of three processes: (1) simple removal of water; (2) partial or complete removal of the complexing agent; and (3) chemical alteration of the complexing agent. Thus, the curing can merely involve drying (or freeze drying) in a suitable atmosphere to remove only the water component but the preferred practice comprises gentle heating of the solution and/or colloidal suspension, e.g., temperatures between about 40°–300° C. This heating removes the water and subsequently volatilizes off and/or alters the complexing agent to impart durability to the final solid product.

Where desired, the solutions or colloidal suspensions can be combined with alkali metal or ammonium silicates and/or hydroxides to form solutions or colloidal suspensions which can then be treated to form solid bodies simulating durable glass or ceramic compositions. Also, pigments can be added to the solutions or colloidal suspensions to provide mixtures useful as paints. Finally, inert fillers can be incorporated in the solutions or colloidal suspensions to produce bodies of varying properties.

DESCRIPTION OF THE PREFERRED EMBODIMENT

Figure 1:
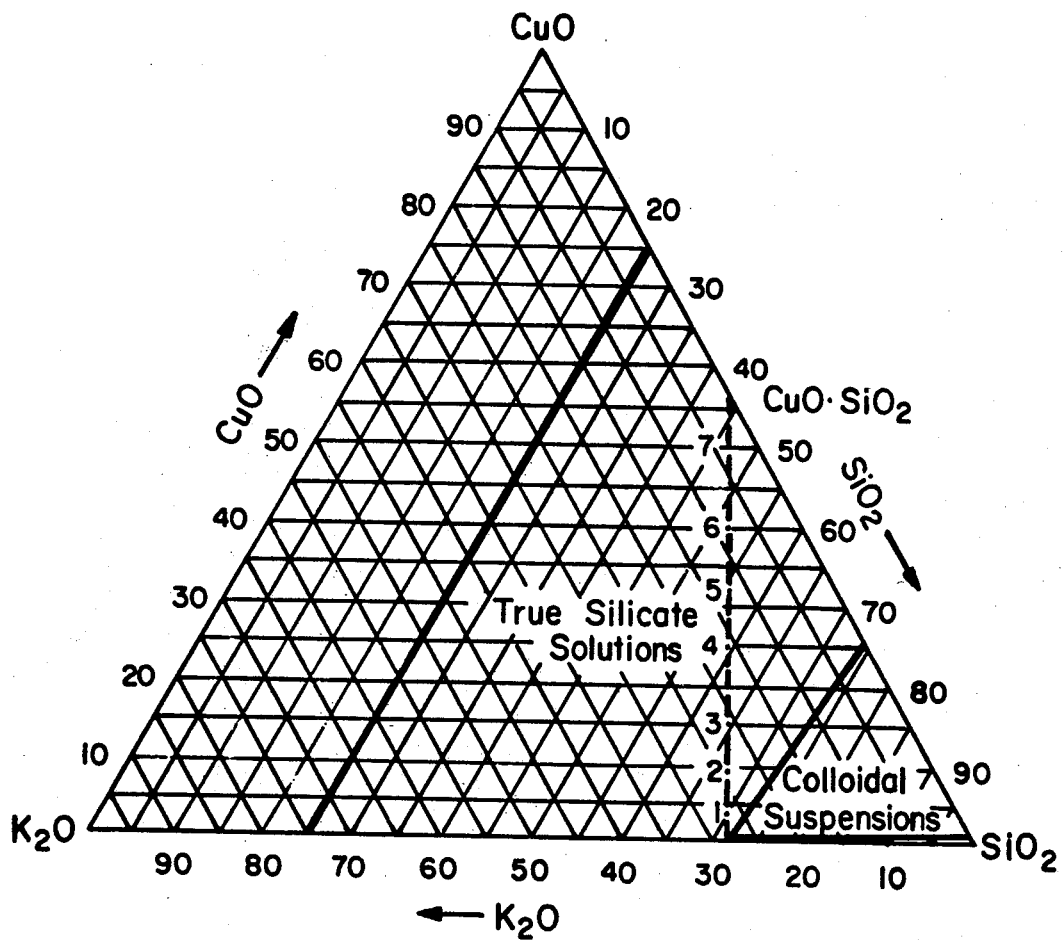

This invention is concerned with the discovery of a method for making solutions and/or colloidal suspensions of water-soluble silicates containing monovalent and divalent metal cations selected from the group consisting of $Cu^+$, $Ag^+$, $Cd^{+2}$, $Sr^{+2}$, $Ca^{+2}$, $Ba^{+2}$, $Co^{+2}$, $Cu^{+2}$, $Pb^{+2}$, $Mg^{+2}$, $Hg^{+2}$, $Ni^{+2}$, $Zn^{+2}$, and $Mn^{+2}$. The invention contemplates reacting in water a silicate of at least one of said monovalent and divalent metal cations with a chelating or complexing agent exhibiting stability at a pH greater than 7 to produce a solution and/or colloidal suspension of complexed silicate, or reacting in water a non-silicate compound of at least one of the said monovalent and divalent metal cations with a chelating or complexing agent exhibiting stability at a pH greater than 7 in the presence of, or subsequently adding thereto, a silica-containing compound to obtain similar complexed silicate products.

The pH of the reaction mixture can be important in determining the production of a solution or a colloidal suspension. Hence, water-soluble silicates can be secured only at pH values greater than about 10.5 whereas colloidal suspensions can be obtained at pH levels only slightly higher than 7. In general, then, water-soluble silicate solutions require aqueous mixtures having a pH between about 10.5–15 whereas useful aqueous colloidal suspensions can be prepared from mixtures having pH values between about 7–15, preferably between about 7–10.5.

The character of the complexing agent is paramount in the operability of the instant invention. Thus, the foremost requirement of the complexing agent is its capability of reacting with the above-recited monovalent and divalent metal cations so as to render a normally water-insoluble silicate or hydroxide soluble in an aqueous solution. Further, inasmuch as the aqueous solutions met in the present invention can be highly alkaline, the complexing agent must exhibit such stability therein that the monovalent or divalent cation will not react with the silicate to yield a water-insoluble silicate or form an insoluble hydroxide precipitate through reaction with hydroxyl ions in the basic aqueous solution. Although it is much to be preferred that the complexing agent not react with the aqueous solution, i.e., to hydrolyze, and thereby produce reaction products capable of reducing the pH of the solution which could lead to the gelation or precipitation of silica within the solution, in certain instances where the complexing agent does not demonstrate a pH greater than 7, such bases as $NH_4OH$, $LiOH$, $KOH$, $NaOH$ and highly basic silicates such as the alkali metal silicates and quaternary ammonium silicate can be added to adjust the pH of the solution. Also, where the presence of alkali metal ions in the final solution is undesirable, mixtures of acidic and basic complexing agents can be utilized to secure the desired pH in the solution.

A rather large spectrum of chelating or complexing agents has been determined to operate satisfactorily in the invention. In general, I have discovered that organic acidic complexing agents containing no fewer than four carbon atoms and organic amine complexing agents containing no fewer than two carbon atoms will work effectively. Also, certain inorganic complexing agents such as $NH_3$, halide ions, and $CN^-$ have been shown to be operative.

Table I records some of the several organic complexing agents, with appropriate abbreviations therefor, which have been found suitable for the invention.

TABLE I

DETA — diethylenetriamine
TATE — triaminotriethylamine
EDTA — ethylenediaminetetraacetic acid
TART — tartaric acid
TATA — triethylenetetraamine
DATA — 1,2-diaminocyclohexanetetraacetic acid
Nta — nitrilotriacetic acid
Pm — 1,2 propylene diamine
En — ethylenediamine Laboratory experimentation has demonstrated that none of the above-recited complexing agents will meet all the necessary requirements for all the various water-insoluble silicates. In other words, none of the compounds recorded in Table I can be defined as a universal complexing agent. Table II correlates the various polyvalent or monovalent silicates with the complexing agents that are effective therefor. Operability is indicated by the presence of a cross mark.

TABLE II

| | $CdO \cdot SiO_2$ | $PbO \cdot SiO_2$ | $MgO \cdot SiO_2$ | $HgO \cdot SiO_2$ | $MnO \cdot SiO_2$ | $ZnO \cdot SiO_2$ | $NiO \cdot SiO_2$ |
|---|---|---|---|---|---|---|---|
| DETA | X | | | X | | X | X |
| TATE | | | | X | | | X |
| EDTA | X | X | X | X | X | X | X |
| TART | | | | | | | |
| TETA | X | | | | | X | |
| DATA | X | | | | X | | |
| Nta | | | | | X | | |
| Pm | | | | | | | |
| En | | | | | | | |
| $NH_3$ | | | | | | | |

| | $CoO \cdot SiO_2$ | $BaO \cdot SiO_2$ | $SrO \cdot SiO_2$ | $CaO \cdot SiO_2$ | $CuO \cdot SiO_2$ | $Cu_2O \cdot SiO_2$ | $Ag_2O \cdot SiO_2$ |
|---|---|---|---|---|---|---|---|
| DETA | | | | | X | X | X |
| TATE | X | | | | X | | X |
| EDTA | X | X | X | X | X | X | |
| TART | | | | | | | |
| TETA | X | | | | | | |
| DATA | X | | | | X | | |
| Nta | | | | | | | |
| Pm | | | | | X | | |
| En | | | | | X | | |
| $NH_3$ | | | | | X | | X |

The combinations reported in Table II are made without regard to pH. Hence, it may be necessary to adjust the pH of the true solutions to achieve a pH therein greater than 10.5 so the silica will be retained in solution. Table III illustrates examples of acid-base complex mixtures which can be utilized to adjust the pH.

TABLE III

| Mole Ratio of DETA/EDTA | pH of Solution | Moles CdO Added | pH of complex |
|---|---|---|---|
| 0.1/0.1 | 6.2 | | |
| 0.15/0.1 | 6.8 | | |
| 0.2/0.1 | 9.75 | 0.2 | 11.3 |

CdO will react in each of the above mixtures but will dissolve completely in the 0.2/0.1 mixture only.

It will be appreciated that Table II reflects a qualitative rather than a quantitative appraisal of the operativeness of the reported complexing agent with the stated metal silicates. Hence, there is a range of compositions of each silicate that can be rendered soluble by a particular complexing agent. Conversely, there is a range of concentrations of the complexing agents which is suitable for solubilizing each normally water-insoluble silicate.

The composition range for the complex stabilized soluble silicates is limited by two factors. The low concentration is determined by the pH required to maintain depolymerized silica which is above about 10.5. However, useful metastable colloids can be prepared at a pH between about 7–10.5, by lowering the concentration of $R_2O$ and/or RO. Complex-stabilized silicate colloidal suspensions can be prepared with $SiO_2/RO$ and/or $R_2O$ mole ratios between 4/1 to 100/1 which remain fluid for months. These materials are new, unique, monovalent or divalently stabilized colloids. Theoretically, the silica-to-hydroxide ion mole ratio should be lower than about 2/1 ($SiO_2$-to-RO and/or $R_2O$ ratio lower than 4/1) to insure a permanently stable silicate solution.

As a practical matter, it was found that transparent or translucent solutions could be formed only if more than 99 weight percent of the metal oxide was complexed, i.e., if the complexing agent was present in at least about the stoichiometric amount to react with the metal ion to form the complex. Useful two phase silicates (partially uncomplexed metal oxides or hydroxides and soluble silicates) occur if less than 99 percent of the metal oxide is complexed, due to the presence of less than stoichiometric amounts of complexing agents or high basicity. The limit for useful materials is at a $SiO_2/RO$ and/or $R_2O$ mole ratios of one-half. At lower ratios, the products formed are not useful as coatings because of the crystalline nature of the solids. At these low ratios there is too little silica in solution to be useful and the hydroxide ion concentration is so high as to destroy the complex stability.

The appended drawings, comprising ternary composition diagrams, serve to illustrate the scope of useful products that can be derived from individual embodiments of the invention. In each instance, DETA constituted the complexing agent. A molar ratio of 2:1 was maintained between the DETA and the respective divalent metal oxide for the zinc and cadmium oxide systems and a 1:1 ratio for the copper oxide system. Thus, FIG. 1 demonstrates that in the $K_2O$—CuO—$SiO_2$ system (DETA:CuO = 1:1) useful products can be secured with silica concentrations greater than 25 weight percent $SiO_2$, i.e., where the mole ratio of $SiO_2$:CuO is above about 1:4.

Figure 2:
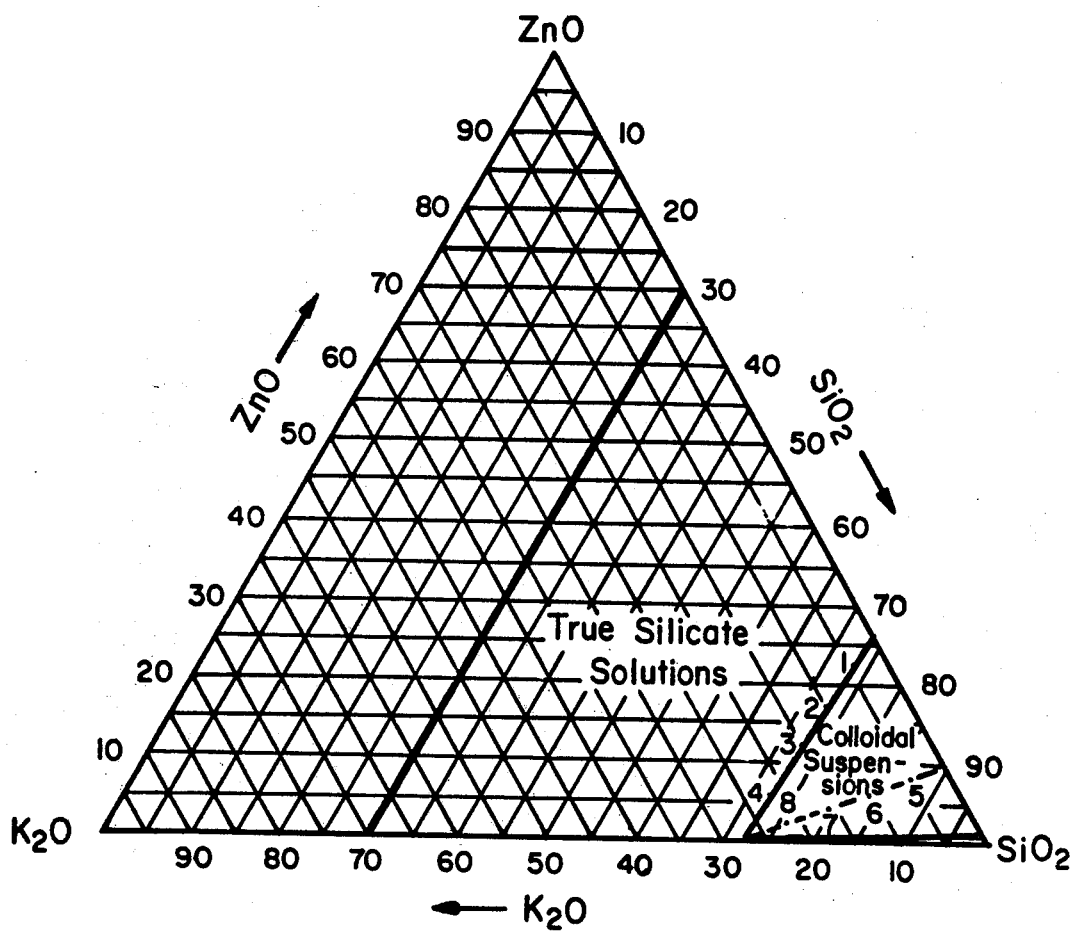

FIG. 2 reports that in the $K_2O$-ZnO-$SiO_2$ system (DETA:ZnO = 2:1) useful products can be obtained with concentrations of $SiO_2$ greater than 30 weight percent, i.e., where the mole ratio of $SiO_2$:ZnO is above about 1:2.

Figure 3:
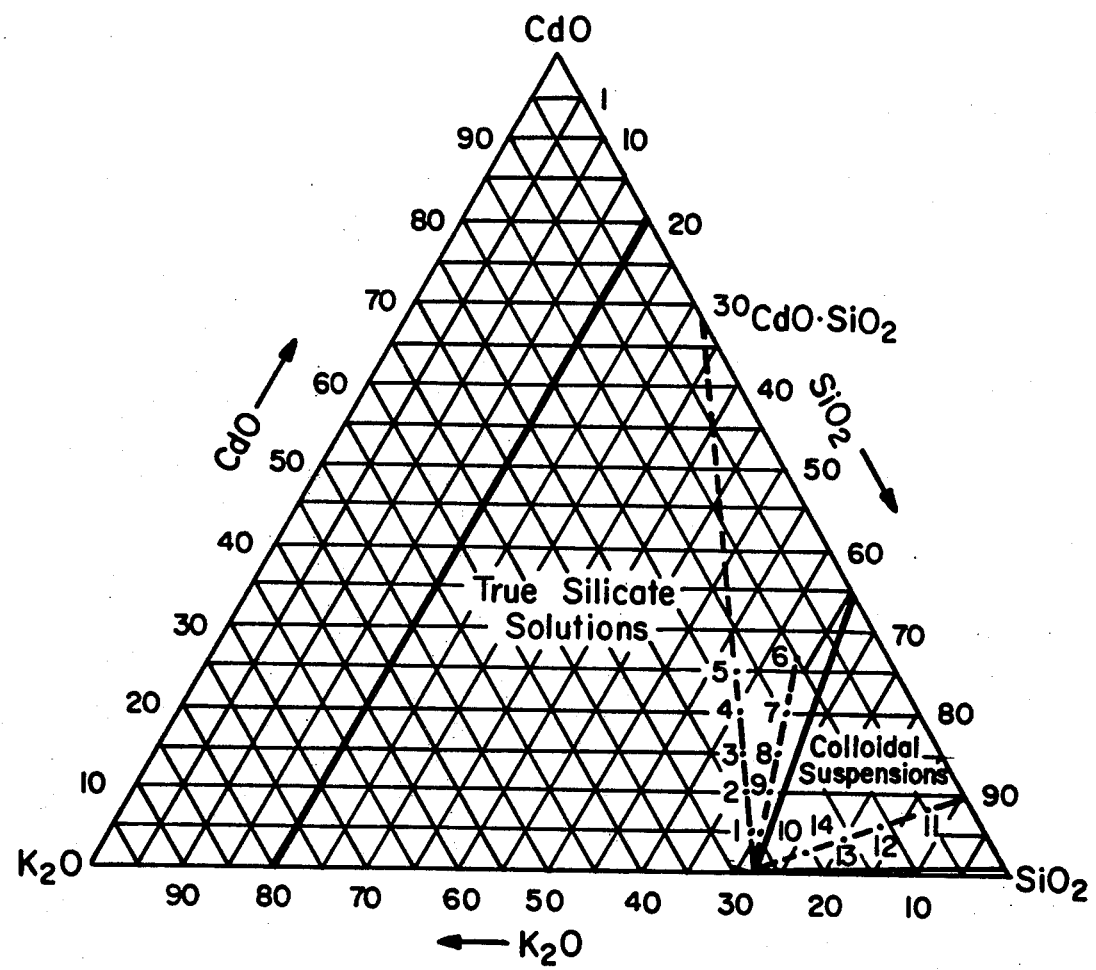

FIG. 3 illustrates that in the $K_2O$—CdO—$SiO_2$ system (DETA: CdO = 2:1) useful products can be achieved with concentrations of silica greater than 25 weight percent, i.e., where the mole ratio of $SiO_2$:CdO is greater than about 1:2. In each drawing, the area labelled "Colloidal Suspensions" is bounded with lines representing $SiO_2/RO$ mole ratios of 4:1 and 100:1.

The solutions and/or colloidal suspensions of the complexed silicates can be cured, i.e., converted to a solid body, in three modes: First, only the water can be removed leaving the complexed silicate compound substantially intact. Second, the water can be removed and thereafter the complexing agent may be partially or completely eliminated. Third, the water can be removed and the complexing agent subsequently chemically altered. Hence, in the first instance, the solution and/or colloidal suspension can be dried in a suitable atmosphere such that only the water is lost. Of course, such sophisticated techniques as freeze drying may also be employed to eliminate the water without removing any substantial part of the complexing agent. However, it is much to be preferred that the complexing agent be removed or chemically altered in some manner such that the solid body will be essentially an inorganic silicate. To accomplish removal of the complexing agent, the solution and/or suspension is frequently merely dried in air and then heated.

The chemical alteration of the complexing agents can take three general approaches: First, oxidation thereof; Second, the formation of insoluble compounds therefrom; and, Third, the formation of polymers therewith. Specific embodiments of each approach are explained hereinafter.

For example, oxidation of the complexing agent can take such forms as: (1) heating in an oxygen atmosphere at temperatures above 100° C.; (2) treating the dried solid body with hydrogen peroxide; or (3) immersing the dried solid body in an aqueous ammonium nitrate solution with subsequent heating to temperatures in excess of 100° C.

The formation of insoluble compounds therefrom can be achieved, for example, by treating amine-containing complexing agents with benzene sulfonylchloride.

Finally, the formation of polymers therewith can take such various forms as: (1) treating an organic acid-containing dried solid body with polyfunctional amines to form polyamide-type polymers; (2) treating an amine-containing dried solid body with organic polyfunctional acids to produce polyamide-type polymers; (3) steam treating a dried solid body containing both acidic and amine complexing agents at temperatures in excess of 100° C. to form polyamide-type polymers; (4) treating a polyamine-containing dried solid body with formaldehyde to form an aminoplast; and (5) treating an amine-containing dried solid body with a concentrated solution of epoxide to form an epoxide-type polymer.

In the following examples demonstrating the process and product obtainable through this invention, the silicate materials utilized were the commercially-marketed preparations recorded below in weight percent:

Colloidal silica — 30% or 40% $SiO_2$, balance water

Lithium polysilicate — 2.1% $Li_2O$, 20% $SiO_2$, balance water

Sodium silicate — 6.75% $Na_2O$, 25.3% $SiO_2$, balance water

Potassium silicate — 8.3% $K_2O$, 20.8% $SiO_2$, balance water

Quaternary ammonium silicate — 9.8% quaternary ammonium ion, 45% $SiO_2$, balance water Reagent or technical grade solutions of the complexing agents were employed as were the compounds of the monovalent and divalent cations.

EXAMPLE I

The compound $CuSiO_3$ was reacted in DETA such as to achieve a DETA:CuO mole ratio of 1:1. Distilled water was then added and this three-component system mixed overnight such that the final solution contained 30 grams $CuSiO_3$, 22.2 grams DETA, and 47.8 grams $H_2O$. The resultant solution was a viscous dark blue solution.

EXAMPLE II

The commercially available water-soluble potassium silicate solution described above was thereafter admixed to the complex solution for Example I in various amounts to produce the seven compositions set out in FIG. 1.

When these seven compositions were applied to metal slides and allowed to air dry, dark blue, water soluble films were formed. This solubility of these films in water demonstrates the complex to be still intact. However, the cation can be released from the complex through a curing treatment of 95°–200° C. for about ¼–16 hours. At temperatures about about 135°C., the cupric ion was reduced in some cases as the complexing agent decomposed to the cuprous ion and copper metal. Such reduction was also observed at baking temperatures lower than 135° C. but where the curing was undertaken for long periods of time.

Compositions containing more than about 35 percent by weight CuO cracked and spalled during the curing step and, hence, were not good coatings without a filler such as titania, silica, alumina, chromium oxide, or the like. When the baking is undertaken at high temperatures and for sufficient time to convert essentially all the cupric ions to metallic copper, the final coating is an alkali silicate with copper metal embedded therein. This coating is much more chemically durable due to the increase silica percentage. However, the non-reduced films are also much more chemically durable than simple alkali silicates because of the copper ions.

There is some leachable phase in these compositions which has been measured as approximating 10 percent of the cured product. At least part of the leachable phase is decomposed complexing agent and any remainder is deemed to be alkali. In any event, after this leachable phase has been removed by water washing, the remaining product manifests no further leaching. Thus, no deterioration has been observed even after three months immersion in running tap water.

These coatings are stable at temperatures up to 700° C. and appear to exhibit even improved chemical durability after such heat treatment. The films, themselves, are translucent to opaque.

EXAMPLE III

Reagent grade zinc oxide was mixed with diethylenetriamine such as to achieve a mole ratio of DETA/ZnO of 2:1. This mixture was added to the commercially available colloidal silica solution described above containing 40 percent silica in such proportion to give a solids content of 23% ZnO, 77% $SiO_2$. The final blend was composed of 12 grams of ZnO, 31.1 grams of DETA, and 73 grams of the colloidal silica. Two grams of water were added thereto and the mixture than rolled in a jar on a ball mill for three days. The solution was clear and viscous.

EXAMPLE IV

Twelve grams of ZnO were reacted with 31.1 grams of DETA. After thorough mixing, 60 grams of the above-defined colloidal silica containing 40 percent silica and 20 grams of water were added to the zinc oxide-DETA mixture. The mixture was alternately heated and cooled from 70° C. to room temperature for about six cycles, each cycle taking about 3 hours. The resultant solution was clear and viscous. The solution had lost 20 grams of water and contained 34.9 percent solids. The solids composition was 33.3% ZnO and 66.7% $SiO_2$.

EXAMPLE V

Twelve grams of zinc oxide were mixed with 31.1 grams of diethylenetriamine. After thorough stirring the mixture was added to 270 grams of the commercial colloidal silica described above containing 40 percent silica. The total mixture was placed on a roller mill in a glass jar and mixed for 16 hours. A nearly water white, translucent liquid resulted which remained fluid for 2 months, gradually becoming more and more viscous.

The solution contained thirty-eight and one tenth (38.1) percent solids which were 10 percent zinc oxide and 90 percent silica.

EXAMPLE VI

One hundred grams of the fresh solution formed in Example V were mixed with 6 grams of zinc oxide and 15.6 grams of diethylenetriamine. The suspension was alternately heated and cooled through four cycles from 70° C. to room temperature, each cycle taking about 3 hours. The resulting mixture was water white and very viscous. This solution was approximately 37 percent solids with solids content of 23% ZnO and 77% $SiO_2$. The viscosity did not change appreciably in 2 months.

EXAMPLE VII

One hundred fifty grams of the solution in Example VI were mixed with 7.6 grams of a solution which was 30% $K_2O$ in distilled water. The second solution was made by adding 35.5 grams of KOH to 64.5 grams distilled water. The solution was water white and viscous. The final solution contained about 34% solids which were 4% $K_2O$, 22% ZnO, and 74% $SiO_2$.

EXAMPLE VIII

The solution formed in Example VII was mixed with the commercial potassium silicate solution noted above to form the compositions numbered 1–4 shown in FIG. 2. These compositions were applied to sand blasted metal slides. The films formed by air drying were glassy and transparent on drying at room temperature.

Example IX

The solution from Example V was mixed with the above-described potassium silicate solution in proportions to give compositions numbered 5–8 in FIG. 2. These compositions were metastable. Initially, they were fluid, translucent suspension solutions with pH of 11.5 or greater, and the pH gradually fell to 10.9–11.0 and the solutions became viscous.

The pot life of these compositions is shown in the following table:

| Composition | Gel Time |
| --- | --- |
| 5 | 5 months |
| 6 | 2 months |
| 7 | 3 weeks |
| 8 | 36 hours |

When fresh, these compositions were applied to sand blasted metal slides whereupon they produce glossy but somewhat porous coatings which became insoluble upon air drying for 24 hours.

EXAMPLE X

A precursor containing 18.8 percent solids was prepared by mixing 7.4 grams $Ca(OH)_2$ with 29.2 grams of ethylenediaminetetraacetic acid and 14 grams of water. 21 grams of this mix were added to a 22.5 grams of the above-described potassium silicate solution. Then 2 grams of a 30% $K_2O$ solution were added. The final solution was 25.2% solids composed of 12% CaO, 31% $K_2O$, and 57% $SiO_2$.

EXAMPLE XI

A mixture of 12 grams of cadmium oxide with 19.4 grams of diethylenetriamine and 70 grams of the above-described colloidal silica containing 40 percent silica was blended for 48 hours on a roller mill. This represented a 2/1 mole ratio of DETA/CdO. The resultant solution was clear and viscous and contained 40 percent solids of which 30% was CdO and 70% $SiO_2$.

EXAMPLE XII

A mixture of 11.1 grams cadmium oxide, 17.7 grams diethylenetriamine and 250 grams of the above-noted colloidal silica containing 40 percent silica was roller milled for 24 hours. The mixture was fluid and clear with a slight translucency. This material remained fluid for 6 months. The resulting mixture was 10% CdO and 90% $SiO_2$ and contained about 39% solids.

EXAMPLE XIII

Ten grams of the fresh solution formed in Example II were mixed with 30 grams of the commercial colloidal silica containing 40 percent silica discussed above. The solutions were completely miscible. This material was diluted to about 20 percent solids. Both the 20 and 39 percent solids mixtures were stable for longer than 6 months. The suspended solids were 2.5% CdO and 97.5% $SiO_2$.

EXAMPLE XIV

Twelve grams of cadmium oxide were mixed with 19.4 grams of diethylenetriamine and 120 grams of the colloidal silica containing 40 percent silica mentioned above. The mixture was mixed for 24 hours after which it was a transparent viscous solution. This solution was 39.6 percent solids with the solids containing 20 percent weight CdO and 80% $SiO_2$.

EXAMPLE XV

Eighty-seven grams of the solution from Example XIV were mixed with 43 grams of "0" grade silica available from Illinois Minerals Co. and 30 grams of chromia oxide. This mixture was mixed in a Waring blender and brushed onto a stainless steel plate. After air drying, this sample was subjected to red heat in a furnace ( 700° C.) or a flame. The resulting coatings were stable, to 1600° C. without melting or spalling.

EXAMPLE XVI

Compositions as shown in FIG. 3 numbered 1–10 were prepared by mixing the solution prepared in Example XIV with potassium hydroxide to prepare compositions 5 and 6 and then mixing 5 and 6 with various amounts of the above-mentioned potassium silicate solution. These coatings were then applied to sand blasted steel slides and were allowed to air dry. The air dried films were hard and transparent. After 24 hours of curing, no weight loss was observed after 16 hours in distilled water for composition 5.

EXAMPLE XVII

The liquid product from Example XII was mixed proportions with the potassium silicate solution described above to give the compositions 11–14 shown in FIG. 3. These compositions were sprayed onto sand blasted slides.

The coatings formed were porous but very insoluble. The liquids 11 and 12 were stable liquids for several months. Composition 14 became extremely viscous after 16 hours. Thus, compositions of this type made durable porous coatings with pot life varying from 16 hours to about 6 months.

EXAMPLE XVIII

Twenty grams of the solution prepared in Example XIV were mixed with 15 grams of distilled water and 45 grams of the commercial lithium polysilicate noted above. The final solution was water white, fluid and contained about 21 percent solids. The solid composition was 9.5% CdO, 5.0% $Li_2O$, and 85.5% $SiO_2$.

EXAMPLE XIX

Thirty grams of liquid prepared in Example XVIII were mixed with 30 grams of Aquadag which is a 22 percent colloidal graphite sold by Acheson Colloids Company. This mixture was applied to a sand blasted metal slide and air dried. The resultant black film developed durability after air drying for 24 hours.

EXAMPLE XX

Forty-five grams of the liquid prepared in Example XVIII were mixed with 1 gram reagent grade KOH. The resulting solution was about 21 percent solids. The solids contained 4.6% $Li_2O$, 8.2% CdO, and 78.5% $SiO_2$. This composition also formed a continuous film when mixed with an equal amount of Aquadag colloidal carbon and applied to a sand blasted steel slide.

EXAMPLE XXI

Seventy grams of the product formed in Example XV were added to 45 grams of a solution with 30 percent by weight solids and solids composition of 36.5% $K_2O$, 62.0% $SiO_2$, 1.32% $P_2O_5$. The resultant solution was water white and fluid and contained 36.4 percent solids. The solids composition was 12.94 weight percent $K_2O$, 73.90% $SiO_2$, 13.15% CdO, and 0.47% $P_2O_5$. This solution was applied to a sand blasted steel substrate and air dried to a transparent continuous film which developed durability after three days of air drying.

EXAMPLE XXII

A solution was prepared as follows: 5 grams of reagent grade $K_2CrO_4$ were dissolved in 10 grams of distilled water. 1.3 grams of KOH were then added along with 44.7 grams of the above described potassium silicate solution. This solution was about 30 weight percent and the solids contained 35.0% $K_2O$, 52.2% $SiO_2$, and 12.8% $CrO_3$. Thirty grams of this solution were mixed with 40 grams of the product of Example XV. The resultant yellow clear fluid solution contained 35.8 percent solids which consisted of 12.8 weight percent CdO, 12.6% $K_2O$, 70% $SiO_2$, and 4.6% $CrO_3$.

EXAMPLE XXIII

Nickel hydroxide was prepared by precipitation from a solution of nickel nitrate. The freshly washed and filtered nickelous hydroxide was mixed with 84 grams of diethylenetriamine and 175 grams of the commercial colloidal silica described above containing 40 percent silica. This mixture became a deep purple and fluid. After about 1 week the material became hard but retained the clear deep purple color.

EXAMPLE XXIV

A silica gel was formed using the above-described sodium silicate solution. This gel was prepared by neutralizing the sodium silicate with 2N HCl. The gel was washed until no Cl⁻ ions could be detected analytically and then filtered and dried at 105° C. The specific surface was measured to 273 $M^2/g$. 40 grams of this gel were added to 12 grams of CdO and 19.4 grams of DETA, and 0.75 grams distilled water. This mixture was milled for 2 days. A viscous water white solution resulted which was 30 percent by weight solids. The solids content was 35% CdO and 65% $SiO_2$.

EXAMPLE XXV

A lead alkali silicate solution was prepared as follows: 17.3 grams (0.1 M) of lead tartrate were mixed with 14.2 grams of KOH and 29.8 grams of water. 60 grams of the commercial colloidal silica containing 40 grams silica were added and the slurry was heated to about 70° C. After about an hour, this mixture became a translucent fluid liquid. This liquid was 38 percent solids. The solids contained 24.5% PbO, 23.5% $K_2O$, and 52% $SiO_2$.

EXAMPLE XXVI

An alkali-free silicate was prepared as follows:
37.3 grams of lead tartrate
12.8 grams of CdO
22.6 grams of DETA
45 grams of the colloidal silica containing 40 percent silica
50 grams of distilled water This solution was mixed and allowed to stand for 16 hours. The solution was clear and contained 30 percent by weight solids. The solids content was 24 percent by weight CdO, 22.3% PbO, and 34% $SiO_2$.

EXAMPLE XXVII 21.6 grams of HgO were mixed with 14.6 grams of triethylenetetraamine and 24 grams of water. 40 grams of the colloidal silica containing 40 percent silica were added and the mixture was mixed on a roller mill in a glass 4 oz. jar. The resultant mixture turned dark grey and then greenish-grey translucent after 2 weeks. It contained 37.6 percent solids which were 57.6% HgO and 42.4% $SiO_2$.

EXAMPLE XXVIII

Ten grams of ZnO were mixed with 20.2 grams of 1,2 propylene (Pm) and 133.3 grams of the above-described colloidal silica containing 30 percent silica. The mixture was placed in a pint glass jar and placed in an oven at 70° C. for a week. The resultant solution was viscous and slightly translucent. The solids content were 20% ZnO and 80% $SiO_2$. The solution was 30% solids.

EXAMPLE XXIX

Thirty grams of $CuO \cdot SiO_2$ were mixed with 26.0 grams of ethylenediamine and 44.0 grams of water. This mixture was mixed for 24 hours. The mole ratio of CuO:ethylenediamine is 1:2 and the solids content was 30 percent of which CuO is 57 percent and $SiO_2$ is 43 percent. The solution is dark blue and viscous.

EXAMPLE XXX 11.5 grams of $MnCO_3$ were mixed with 29.2 grams of ethylene-diaminetetraacetic acid. 30 grams of water were added and the suspension was mixed until foaming subsided. Ten grams of KOH pellets were added and further foaming ensued. When foaming was finished, most of the $CO_2$ liberated from the $MnCO_3$ was gone and further heating at 70° C. was done to insure all removal of $CO_2$. To the $CO_2$-free mixture 13.1 grams of KOH pellets were added. This solution was 25.9 percent solids of which 36.5 percent was MnO and 63.5 percent was $K_2O$.

Thirty grams of this mixture was added to thirty grams of the above-described potassium silicate solution. The final solution was 27.5 percent solids with 45% $K_2O$, 39% $SiO_2$, and 16% MnO.

EXAMPLE XXXI 16.9 grams of silver nitrate were dissolved in 13.1 grams of $H_2O$. 10.3 grams of diethylenetriamine were added drop-wise. Thirty grams of the above-mentioned colloidal silica containing 40 percent silica were then added. About 4 drops of 30% $H_2O_2$ were added. After a week the solution became translucent and viscous. This solution contained 50.7% $SiO_2$ and 49.3% $Ag_2O$.

EXAMPLE XXXII

Three grams of $Cu(NO_3)_2 \cdot 3H_2O$ were mixed with 25 ml. of a 18.7N $NH_4OH$ solution. Then 5 grams of $K_3PO_4$ were added along with 50 grams of the above-described potassium silicate solution. The resultant blue solution was 25.5 percent solids of which CuO is 4.8 percent, $P_2O_5$ is 8.11 percent, $K_2O$ is 36.4 percent, and $SiO_2$ is 50.7 percent.

EXAMPLE XXXIII

Fifty grams of the potassium silicate solution described above were mixed with 3.5 grams of $K_3PO_4$. This solution was then mixed with a solution formed from 1 gram of $Cu(NO_3)_2 \cdot 3H_2O$ and 9 grams of concentrated $NH_4OH$ (18.7N). The resultant blue solution was 28.9% solids of which 1.8 percent was CuO, 6.36 percent was $P_2O_5$, 35.2 percent was $K_2O$, and 56.6 percent was $SiO_2$.

EXAMPLE XXXIV

Fifty grams of the potassium silicate solution referred to above was mixed with 1.3 grams of $K_2HPO_4$. This solution was mixed with a solution containing 2.5 ml. of an 18.7N $NH_4OH$ solution on 0.75 grams of $Cu(NO_3)_2 \cdot 3H_2O$. The resultant blue solution contained 29.5 percent solids of which CuO was 1.54 percent, $P_2O_5$ was 3.34 percent, $K_2O$ was 30.3 percent, and $SiO_2$ was 64.9 percent.

EXAMPLE XXXV

Three grams of $Ni(NO_3)_2 \cdot 6H_2O$ were mixed with 25 ml. of concentrated $NH_4OH$ (18.7N) and the solution was added to 50 grams of the above-described potassium silicate solution. The resultant dark blue solution was 25.2 percent solids of which NiO was 3.7 percent, $P_2O_5$ was 8.3 percent, $K_2O$ was 36.8 percent, and $SiO_2$ was 51.2 percent.

EXAMPLE XXXVI

A tenth mole of ethylenediaminetetraacetic acid was mixed with 26.6 grams $Ba(NO_3)_2$, 30 grams of $H_2O$, and 11 grams of $NH_4OH$ (18.7N). Thirty grams of a 30% $K_2O$ in water solution and 100 grams of the potassium silicate solution referred to above were mixed together.

The above two mixtures were blended together resulting in a translucent solution of 23.5 percent solids which was composed of 28.7% BaO, 39.0% $SiO_2$, and 32.3% $K_2O$.

EXAMPLE XXXVII 28.4 grams of Sr $Sr(NO_3)_2 \cdot 4H_2O$, 30 grams of water, 11 grams of 18.7N $NH_4OH$ solution, and 29.1 grams of ethylenediaminetetraacetic acid were mixed together.

To this mixture 100 grams of the potassium silicate solution described above and 30 grams of a 30% $K_2O$ solution were added.

This resulted in a translucent solution consisting of 21.2 percent solids which were composed of 21.4% SrO, 42.8% $SiO_2$, and 35.8% $K_2O$.

The following examples are illustrative of the several means by which the complexing agent can be chemically altered rather than removed from the final product.

EXAMPLE XXXVIII

One hundred thirty-six grams of ZnO were combined with 360 grams of DETA and then 2155 grams of the above-described colloidal silica containing 40 percent silica were added thereto. The mixture was placed in a glass bottle on a roller mill and mixed for 8 days. Thereafter, the solution was a cloudy translucent, containing 39.5 percent solids of which 86.4 percent was silica and 13.6 percent was zinc oxide.

Three hundred grams of that solution were run into 100 grams of water, yielding a solution of about 30 percent solids. 50 grams of this latter solution were mixed with 9.5 grams of the potassium silicate solution referred to above.

EXAMPLE XXXIX

A film approximately 0.002 inch thick was applied to the surface of a sand blasted cold rolled steel slide by air spraying the final mixture of Example XXXVIII thereon and then allowing to air dry for 15 minutes. The slide was thereafter heated to 300° C. in a stream of oxygen so as to oxidize the DETA and leave an essentially water-insoluble film on the slide.

EXAMPLE XL

A film approximately 0.002 inch thick was applied to the surface of a sand blasted cold rolled steel slide by air spraying the final mixture of Example XXXVIII thereon and then allowing to dry in air for 15 minutes. The slide was subsequently immersed in a 30% $H_2O_2$ in water solution so as to oxidize the DETA and leave an essentially water-insoluble film on the slide.

EXAMPLE XLI

A film approximately 0.002 inch thick was applied to the surface of a sand blasted cold rolled steel slide by air spraying the final mixture of Example XXXVIII thereon and then allowing it to dry in air for 15 minutes. The slide was thereafter immersed into a saturated solution of $NH_4NO_3$, removed therefrom and dried in air, and then heated to about 300° C. The DETA was oxidized leaving an essentially water-insoluble film.

EXAMPLE XLII

A film approximately 0.002 inch thick was applied to the surface of a sand blasted cold rolled steel slide by air spraying the final mixture of Example XXXVIII thereon and subsequently allowing it to dry in air for 15 minutes. The slide was thereafter immersed in a concentrated solution of benzene sulfonylchloride. When the slide was removed therefrom and dried in air, the DETA has oxidized leaving a film which was essentially water-insoluble.

EXAMPLE XLIII

A film approximately 0.002 inch thick was applied to the surface of a sand blasted cold rolled steel slide by air spraying the final mixture of Example XXXVIII thereon and then allowing to air dry for 15 minutes. The coated slide was subsequently immersed into an adipic acid solution, removed therefrom, and thereafter autoclaved at 200° C. for two hours in saturated steam, resulting in a polyamide-type coating.

EXAMPLE XLIV

A film approximately 0.002 inch thick was applied to the surface of a sand blasted cold rolled steel slide by air spraying the solution from Example XXVI thereon and then allowing it to dry in air for 15 minutes. Thereafter, the slide was autoclaved at 200° C. for two hours in saturated steam, resulting in a polyamide-type coating.

EXAMPLE XLV

A film approximately 0.002 inch thick was applied to the surface of a sand blasted cold rolled steel slide by air spraying the mixture derived from Example XXV thereon and then allowing it to dry in air for 15 minutes. The coated slide was thereafter briefly sprayed with hexanethylenediamine solution and again allowed to dry in air for 15 minutes. Finally, the slide was autoclaved at 250° C. for four hours in saturated steam, resulting in a glossy and continuous polyamide-type polymer believed to be a tartaric-hexanethylene amide.

EXAMPLE XLVI

A film approximately 0.002 inch thick was applied to the surface of a sand blasted cold rolled steel slide by air spraying the final mixture of Example XXXVIII thereon and subsequently allowing it to dry in air for 15 minutes. The coated slide was thereafter immersed in a commercial 37 percent solids solution of formaldehyde in water with methanol stabilization. The slide was removed therefrom, allowed to dry in air for 15 minutes, and then heated in air to 140° C. Aminoplasts were seen to have formed within the film.

EXAMPLE XLVII

A film approximately 0.002 inch thick was applied to the surface of a sand blasted cold rolled steel slide by air spraying the final mixture of Example XXXVIII thereon and subsequently allowed to dry in air for 15 minutes. The slide was thereafter immersed into an epoxy resin (Jones-Dabney EPIREZ 504). After removal therefrom, the coated slide was heated to 100° C. and maintained thereat for 24 hours, resulting in a hardened epoxy film.

I claim:

1. A method for making an alkaline aqueous silicate solution and/or colloidal suspension containing at least one cation selected from the group consisting of $Ag^+$, $Cu^+$, $Cd^{+2}$, $Ca^{+2}$, $Sr^{+2}$, $Ba^{+2}$, $Co^{+2}$, $Pb^{+2}$, $Mg^{+2}$, $Hg^{+2}$, $Ni^{+2}$, $Zn^{+2}$, and $Mn^{+2}$ which comprises reacting said cation in the presence of water with silicate ion and a complexing agent selected from the group consisting of an organic acidic complexing agent containing at least four carbon atoms and an organic amine complexing agent containing at least two carbon atoms exhibiting stability at a pH greater than 7, said reaction mixture demonstrating a pH greater than 7, to produce an aqueous solution and/or colloidal suspension of a complexed silicate.

2. A method according to claim 1 wherein said organic acidic complexing agent is selected from the group consisting of ethylenediaminetetraacetic acid, nitrilotriacetic acid, tartaric acid, and 1,2-diaminocyclohexanetetracetic acid.

3. A method according to claim 1 wherein said organic amine complexing agent is selected from the group consisting of diethylenetriamine, ethylenediamine, 1,2propylene diamine, triaminotriethylamine, and triethylenetetraamine.

4. A method according to claim 1 wherein the mole ratio $SiO_2$: cation oxide is greater than 1:2.

5. A method according to claim 4 wherein at least 99 weight percent of the cation oxide is complexed to produce a transparent or translucent solution.

6. A method according to claim 4 wherein the mole ratio $SiO_2$: cation oxide is between about 4:1 to 100:1.

7. A method according to claim 1 wherein the reaction mixture to produce said aqueous solution of a complexed silicate demonstrates a pH between about 10.5–15.

8. A method according to claim 1 wherein the reaction mixture to produce said aqueous colloidal suspension of a complex silicate demonstrates a pH between about 7–10.5.

9. A method according to claim 1 wherein said aqueous solution and/or colloidal suspension of a complexed silicate is combined with a water soluble compound exhibiting stability at a pH greater than 7.

10. A method according to claim 9 wherein said soluble compound is selected from the group consisting of a silicate or hydroxide of lithium, sodium, potassium and ammonium.

* * * * *

UNITED STATES PATENT OFFICE
CERTIFICATE OF CORRECTION

Patent No. 3,715,224                    Dated February 6, 1973

Inventor(s) Larry E. Campbell

It is certified that error appears in the above-identified patent and that said Letters Patent are hereby corrected as shown below:

Column 1, line 41, change "neutral" to -- neutralize --.

Columns 3 and 4, Table II, Heading "$PbO \cdot SiO_2$", line 4, insert -- X --.

Column 10, line 4, change "( 700°C.)" to -- (~700°C.) --.

Column 10, Example XXI, line 63, change "36.5%" to -- 36.6% --.

Column 11, Example XXII, line 12, after "percent" insert -- solids --.

Column 12, Example XXIX, line 25, change "$CuO \cdot {}^{SiO}2$" to -- $CuO \cdot SiO_2$ --.

Column 13, Example XXXVII, line 45, delete the first "Sr".

Column 15, Claim 1, line 42, after "$Cd^{+2}$" insert -- $Cu^{+2}$ --.

Signed and sealed this 20th day of November 1973.

(SEAL)
Attest:

EDWARD M. FLETCHER, JR.                RENE D. TEGTMEYER
Attesting Officer                      Acting Commissioner of Patents